(12) United States Patent
Oppitz

(10) Patent No.: US 6,308,794 B1
(45) Date of Patent: Oct. 30, 2001

(54) PARALLEL HYBRID DRIVE FOR A MOTOR VEHICLE HAVING A CLUTCH WHICH IS INTEGRATED IN THE ELECTRICAL MACHINE, AND AN ASSOCIATED ELECTRIC MOTOR UNIT

(75) Inventor: Horst Oppitz, Dittelbrunn (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/369,014

(22) Filed: Aug. 5, 1999

(30) Foreign Application Priority Data

Aug. 6, 1998 (DE) .............................................. 198 35 575

(51) Int. Cl.⁷ ...................................................... B60K 1/00
(52) U.S. Cl. ............................ 180/65.2; 180/54.1; 192/14
(58) Field of Search ................................ 180/65.1, 65.2, 180/65.3, 65.4, 165, 54.1; 192/3, 5, 6, 12, 14

(56) References Cited

U.S. PATENT DOCUMENTS

| | | | |
|---|---|---|---|
| 4,533,011 | * | 8/1985 | Heidemeyer et al. .............. 180/65.2 |
| 5,433,282 | * | 7/1995 | Moroto et al. ...................... 180/65.2 |
| 5,492,189 | * | 2/1996 | Kriegler et al. .................... 180/65.2 |
| 5,562,566 | * | 10/1996 | Yang ......................................... 477/3 |
| 5,773,904 | * | 6/1998 | Schiebold et al. ...................... 310/92 |
| 6,019,183 | * | 2/2000 | Shimasaki et al. ................... 180/165 |
| 6,059,059 | * | 5/2000 | Schmidt-Brucken ............... 180/65.3 |
| 6,158,405 | * | 12/2000 | Masberg et al. .................. 123/192.1 |

FOREIGN PATENT DOCUMENTS

| | | |
|---|---|---|
| 29 43 519 | 5/1981 | (DE) . |
| 32 46 230 | 6/1984 | (DE) . |
| 38 06 760 | 9/1989 | (DE) . |
| 40 41 117 | 7/1992 | (DE) . |
| 43 23 602 | 1/1995 | (DE) . |
| 195 03 501 | 8/1996 | (DE) . |
| 195 30 233 | 2/1997 | (DE) . |
| 54-150031 | 10/1953 | (JP) . |
| 6-4343 | 1/1994 | (JP) . |
| 6-144020 | 5/1994 | (JP) . |
| 8-318741 | 12/1996 | (JP) . |

* cited by examiner

*Primary Examiner*—Brian L. Johnson
*Assistant Examiner*—Bridget Avery
(74) *Attorney, Agent, or Firm*—Cohen, Pontani, Lieberman & Pavane

(57) ABSTRACT

A parallel hybrid drive for a motor vehicle includes a clutch integrated in an electric motor unit of the electrical machine of the parallel hybrid drive for allowing the electric motor unit to be disengaged from the drive train. Therefore, pure internal combustion engine drive is possible, without rotating the rotor of the electrical machine or the electric motor unit.

20 Claims, 7 Drawing Sheets

PARALLEL HYBRID DRIVE FOR A MOTOR VEHICLE HAVING A CLUTCH WHICH IS INTEGRATED IN THE ELECTRICAL MACHINE, AND AN ASSOCIATED ELECTRIC MOTOR UNIT

BACKGROUND OF THE INVENTION

1. Field of the Invention

The present invention relates to a parallel hybrid drive for a motor vehicle including a drive train with an internal combustion engine and an electric machine connected to a transmission, wherein a first clutch is arranged in the drive train between the internal combustion engine and the transmission and wherein the transmission is arranged between the first clutch and the electrical machine.

2. Description of the Related Art

A prior art parallel hybrid drive is disclosed in DE 195 30 233 A1 and has a drive unit including an internal combustion engine, a transmission, an electrohydraulic disengaging clutch which is used as a "first clutch" connected between the internal combustion engine and the transmission and an electric motor. The electric motor of the drive unit acts directly on the drive shaft of the transmission via a gear wheel layshaft stage without the interposition of a clutch. The internal combustion engine also acts on the drive shaft of the transmission via the disengaging clutch. The electric motor is connected to a power supply unit having batteries and a current regulating unit and may be used as a drive motor, a generator for charging the batteries when the internal combustion engine is being operated, a starter motor for the internal combustion engine, and a synchronizing device for the transmission.

Another prior art parallel hybrid drive for a motor vehicle is disclosed in DE 195 03 501 A1. A drive train in this prior art parallel hybrid drive includes an internal combustion engine, a clutch designed as a freewheeling device and whose rotation direction can be changed, an electrical machine of the external rotor type, a disengaging clutch and a transmission following one another. The motor vehicle may optionally be driven by either the electrical machine—which then acts as an electric motor—or by the internal combustion engine on its own. When the motor vehicle is driven by the electrical machine, the internal combustion engine is stopped and the freewheeling clutch is disengaged. When the motor vehicle is being driven by the internal combustion engine, the freewheeling clutch is closed and the electrical machine is either not energized or operated as a generator. The freewheeling clutch may have an associated bridging clutch such that the electrical machine may optionally drive the internal combustion engine while the electrical machine is driving the motor vehicle when the bridging clutch is closed. The bridging clutch allows the internal combustion engine to be started by of the electrical machine. A claw clutch which can be engaged and disengaged by an electromagnet, for example, is mentioned as the bridging clutch.

The electrical machine of this known parallel hybrid drive comprises a stator with field windings which is held by the housing of the internal combustion engine and encloses the freewheeling clutch. A permanent-magnet external rotor of the electrical machine is fitted with a clutch housing for the disengaging clutch. The freewheeling clutch or the bridging clutch directly connects a shaft of the rotor to the crankshaft of the internal combustion engine. On the transmission side, the rotor acts directly via the disengaging clutch on the input shaft of the transmission. With the exception of the rotor shaft, which may also be regarded as an extension of the crankshaft, neither an electric motor shaft on the internal combustion engine side nor an electric motor shaft on the transmission side may be associated with the electric motor. Seen overall, the electrical machine of this prior art hybrid drive is not a structurally and functionally autonomous unit with respect to the internal combustion engine, the disengaging clutch and the transmission.

With regard to further prior art parallel hybrid drives having an electric motor arranged between the internal combustion engine and the transmission, reference is made to DE 29 43 519 A1 and DE 43 23 602 A1. In DE 29 43 519 A1, the electric motor has an associated freewheeling mechanism which separates the synchronization of the transmission from the moment of inertia of the electric motor. In DE 43 23 602 A1, the electrical machine is integrated in a friction-clutch arrangement which connects the crankshaft of an internal combustion engine to the transmission input shaft of a transmission.

In general, if the electrical machine of a hybrid drive is required to rotate during internal combustion engine operation, losses occur either from the fact that unavoidable iron losses occur in the unenergized electrical machine or from the fact that the fuel energy is not optimally converted into electrical energy because the efficiency of the electrical machine when operating as a generator is not optimum.

SUMMARY OF THE INVENTION

It is an object of the present invention to develop a parallel hybrid drive so that losses generated by the rotation of the electric drive during internal combustion engine operation are avoided. To achieve this object, a parallel hybrid drive comprises a drive train including an internal combustion engine, an electric machine, a transmission, and a first clutch for connecting internal combustion engine to the transmission. The inventive drive train further comprises a second clutch integrated in the electrical machine for selectively connecting and disconnecting the electrical machine from the rest of the drive train.

The second clutch which is integrated in the electrical machine allows the disengagement of the electrical machine from the transmission during operation of the internal combustion engine, so that the electrical machine (also referred to as the electric motor for short in the following text) does not rotate during operation of the vehicle by the internal combustion engine, thereby eliminating iron losses which would otherwise occur. According to the invention, the second clutch includes a clutch which is integrated in the electric motor rather than a clutch which is separate from the electric motor in the drive train. This may be surprising because the integration of a clutch requires a specifically designed electric motor to be produced for the parallel hybrid drive according to the invention. It is difficult to imagine this arrangement being used at all for a parallel drive in which the electric motor is at the same time intended to be used as a generator during internal combustion engine operation. In fact, it would appear to be much more advantageous to provide a separate clutch between the electric motor and the transmission so that inexpensive and available generic components are used to design the parallel hybrid drive.

However, the integration according to the invention of the second clutch in the electric motor is particularly advantageous since the physical space for a clutch which is separate from the electric motor is saved. It has even been found that the cost outlay for providing the second clutch in the electric motor is, surprisingly, less than the cost outlay for a prior art motor with a separate clutch despite the requirement for a specifically designed electric motor or electric motor component. This is particularly true if the electrical machine, or the electric motor, is designed as a unit which is separate from the transmission, so that the unit, which has already been prefabricated, can be fitted to the transmission in a particularly cost-effective manner. When assembled, the unit can form a drive unit with the transmission and, possibly, with the internal combustion engine.

The electrical machine, in particular the above-mentioned electric motor unit, includes a rotor such, for example, as a permanent-magnet rotor connected to a rotor shaft such that they rotate together. The rotor shaft is mounted such that it can rotate on a shaft bearing arrangement held by a body section of the electrical machine. The shaft bearing arrangement is preferably arranged axially between the second clutch and the rotor.

A particularly compact arrangement is possible if the electrical machine is designed as an external rotor type with a radial part which connects the cylindrical rotor to the rotor shaft. This type of design allows the rotor to radially surround the outside of the shaft bearing arrangement and for the shaft bearing arrangement to be arranged axially between the second clutch and the radial part which connects the cylindrical rotor to the rotor shaft. Furthermore, the second clutch, which is coaxial with respect to the rotor, may be arranged inside a cavity in the electrical machine, which is bounded, at least partially, by a body section of the electrical machine which is used as the stator. The arrangement permits the rotor to radially surround the outside of at least a portion of the second clutch to save space.

It particularly preferred for the electrical machine to surround a drive shaft which runs on the same axis as the rotor shaft and which engages the rotor shaft via the second clutch. According to an embodiment, the second clutch is arranged between the rotor shaft and the output drive shaft, and physically separates them from one another. In a second embodiment, the rotor shaft is designed as a hollow shaft through which the output drive shaft, which is coaxial with respect to the hollow shaft, extends from the second clutch to beyond that end of the hollow shaft which is remote from the second clutch. A section of the drive shaft which projects beyond this end of the hollow shaft may be used as a connecting section for connection to a component which is to be driven such as an associated transmission input shaft, such that they rotate together.

For this second embodiment, it is proposed, that the output drive shaft be mounted within the hollow rotor shaft with respect to a compact design of the electrical machine in the axial direction and secure mounting of the output drive shaft. It is furthermore proposed that a connecting section of the output drive shaft project out of an opening in a housing of the electrical machine, in which case this opening is also used for installation of the hollow rotor shaft and/or of the rotor. There is then no need for a separate opening for the output drive shaft to pass out of.

In this context, is it proposed that the housing have an attachment arrangement in the vicinity of the opening, for attachment to an associated support, in particular the transmission. The attachment arrangement such, for example, as an annular attachment flange around the opening preferably allows the opening to be at least partially closed by the correspondingly designed support. This eliminates the need for a separate closure cover or the like.

In both the above embodiments, the output drive shaft is mounted on a closure body that is separate from the body section which is used as the stator, such that it can rotate, and is used to close the cavity which holds the second clutch.

The second clutch according to the present invention may be operated mechanically, electrically, electromagnetically, hydraulically or pneumatically. In a preferred embodiment, the second clutch is a positively locking claw clutch which is preferably synchronized. For this purpose, the claw clutch may comprise a synchronizing device having a first pinion on the rotor shaft side, a second pinion on the output drive shaft side and a synchronizing pinion which has switching claws. The axially movable synchronizing pinion is permanently engaged in a positively locking manner with a tooth system on one of the first pinion and the second pinion and can selectively be engaged with and disengaged from a tooth system on the other of the first and second pinions in a positively locking manner by axial movement. A synchronizing ring is preferably arranged between the first and second pinions and is designed to cause the rotation speeds of these two pinions to be matched by friction coupling of the synchronizing pinion and other pinion, and to prevent the positively locking engagement between these two pinions from being produced before these rotation speeds are matched. It is particularly cost-effective to design the claw clutch using a synchronizing device of a motor vehicle transmission.

Alternatively, the second clutch may be a friction clutch, which can preferably be operated electromagnetically. Irrespective of the nature of the clutch, electrical or electromagnetic operation is particularly expedient, since simple actuation is possible without any major mechanical, hydraulic or pneumatic complexity. The electrical machine in any case actually has to be actuated electrically for the electric motor drive.

According to another aspect, the invention relates to an electric motor unit for a parallel hybrid drive as described above. The electric motor unit according to the invention comprises a rotor which is mounted such that it can rotate with respect to a stator, an output drive shaft which is mounted such that it can rotate, and a clutch which is integrated in the electric motor unit. The clutch, which corresponds to the second clutch in the parallel hybrid drive described above, is used for selective engagement and disengagement of the rotor with and from the output drive shaft, possibly via a rotor shaft which is connected to the rotor such that they rotate together. The electric motor unit according to the invention and/or the clutch which is integrated in it may have at least some of the features of the electrical machine and/or of the second clutch of the parallel hybrid drive described above. Designing the rotor shaft as a hollow shaft having an output drive shaft which is passed through it, and designing the clutch as a positively locking clutch, in particular a claw clutch are particularly advantageous options for the design of the electric motor unit.

The following must also be stated with regard to the design of the second clutch and of the clutch which is integrated in the electric motor unit as a positively locking clutch. A positively locking clutch requires synchronization of the clutch and of the parts which have to be engaged with one another. Positively locking clutches having synchronizing devices are admittedly known (one such is preferably used as a second clutch or as a clutch which is integrated in the unit). The moment of inertia of the electric motor is normally very high. Accordingly, there is an unavoidable concern that correct clutch operation cannot be maintained over a lengthy time period because the synchronizing device could be subject to a correspondingly large amount of wear due to the high moment of inertia of the electric motor.

However, it has been found that these concerns do not apply and that the positively locking clutch can be constructed even using a conventional synchronizing device in a motor vehicle transmission. The latter was surprising since the transmission components which have to be brought to the same rotation speed when shifting gear in a motor vehicle transmission by means of a synchronizing ring or the like have moments of inertia which are considerably less than those of an electric motor which is suitable for driving a motor vehicle. The invention thus also relates to the use of a synchronizing device of a motor vehicle transmission for constructing the second clutch of a parallel hybrid drive as described above, and/or to the clutch which is integrated in the electric motor unit described above.

The invention furthermore relates to a method for engaging an electrical machine which can be engaged with and disengaged from a drive train of a motor vehicle parallel hybrid drive via a clutch when the motor vehicle is moving. The electrical machine has a rotor which is mounted such that it can rotate and which can selectively be engaged with and disengaged from an output drive shaft or a transmission input shaft - possibly via a rotor shaft which is connected to the rotor such that they rotate together —by the clutch which is designed as a positively locking claw clutch. In principle, no special procedures are required for engaging the electrical machine in such a motor vehicle parallel hybrid drive, provided the positively locking clutch is a synchronized positively locking clutch. For the case of a positively locking clutch without synchronization and for particularly smooth, low-wear engagement in the case of a synchronized positively locking clutch, the invention proposes that the electrical machine be actuated for engagement in the sense of being an electric motor to accelerate the rotor, until the drive shaft or the transmission input shaft on the one hand and the rotor and the rotor shaft on the other hand are rotating at approximately the same speed, before a coupling element of the positively locking clutch is operated in the sense of engaging it. In the case of a synchronized positively locking clutch, a synchronizing element of the clutch then ensures that the elements to be coupled are rotating at the same speed before the positively locking clutch engagement is produced.

For the case when the electrical machine is engaged when the motor vehicle is stationary, a method for engagement is proposed in which the electrical machine is actuated as an electric motor to accelerate the rotor in alternating rotation directions, in which case a coupling element of the positively locking clutch is operated at the same time as this.

The invention furthermore relates to a method for disengaging the electrical machine from the drive train when the motor vehicle is in motion, so that the motor vehicle may be driven solely by the internal combustion engine without rotating the rotor. For this purpose, it is proposed that prior to disengagement, the electrical machine be actuated as an electric motor to accelerate the rotor to relieve torques acting on the torque-transmitting positively locking elements of the clutch. When the positively locking elements are relieved of torques acting on them, a coupling element of the positively locking clutch may be operated, in the sense of disengaging it, without any major operating forces and without the risk of wear.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
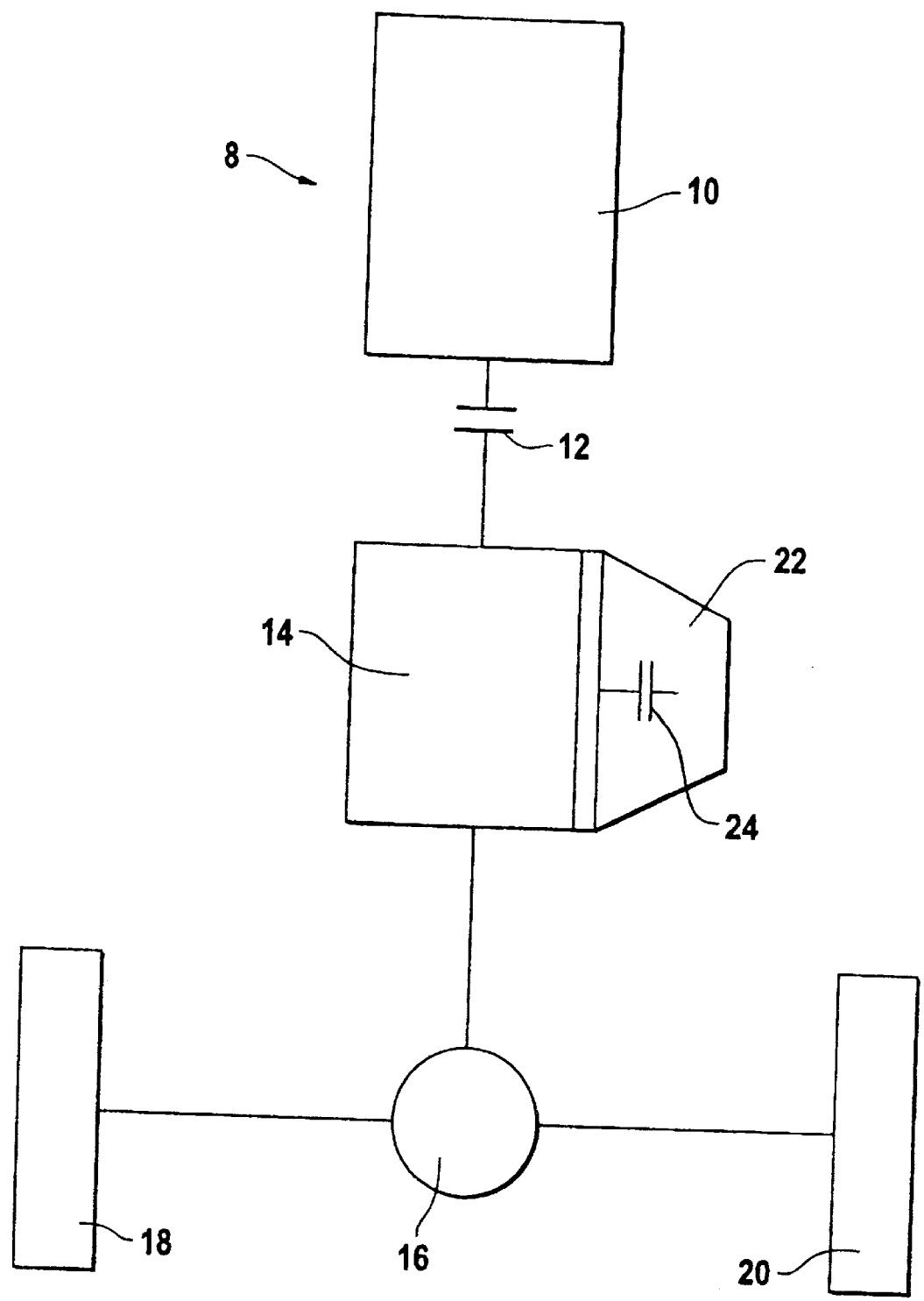
FIG. 1 is a schematic diagram showing a parallel hybrid drive according to an embodiment of the present invention.

FIG. 1 is a schematic diagram showing an exemplary embodiment of a parallel hybrid drive 8 according to the invention having an internal combustion engine 10 connected to a transmission 14 via a first clutch 12 comprising a disengaging clutch—i.e., a friction clutch. The transmission 14 is connected via a drive shaft to a differential apparatus 16, which in turn is connected to a left-hand and right-hand drive wheel 18 and 20, respectively. An electric motor unit 22 is connected via a flanged connection to the transmission 14 and has integrated in it a second clutch 24 for selectively engaging a rotor of the electric motor unit with the transmission input shaft associated with the electric motor unit and disengaging the rotor from the transmission input shaft. Since the transmission 14 is arranged in the drive train of the parallel hybrid drive 8 between the second clutch 24 of the electric motor unit 22 and the first clutch 12, the internal combustion engine 10 may be operated without rotation of the rotor of the electric motor unit 22. Iron losses in the electric motor, which may reach a considerable order of magnitude such, for example, as approximately 5 kW are avoided, thereby resulting in reduced fuel consumption.

The following describes various embodiments of the electric motor unit 22 according to the invention which may be used with the parallel hybrid drive 8 in FIG. 1. The description of the individual exemplary embodiments uses the same reference symbols, with the suffix letters a, b, c and d respectively added to them, for identical or analogous parts. The description in each embodiment explains only the differences from the previously described exemplary embodiments. To this extent, the description of each embodiment includes an expressly made reference to the description of the preceding embodiments that are already described.

Figure 2:
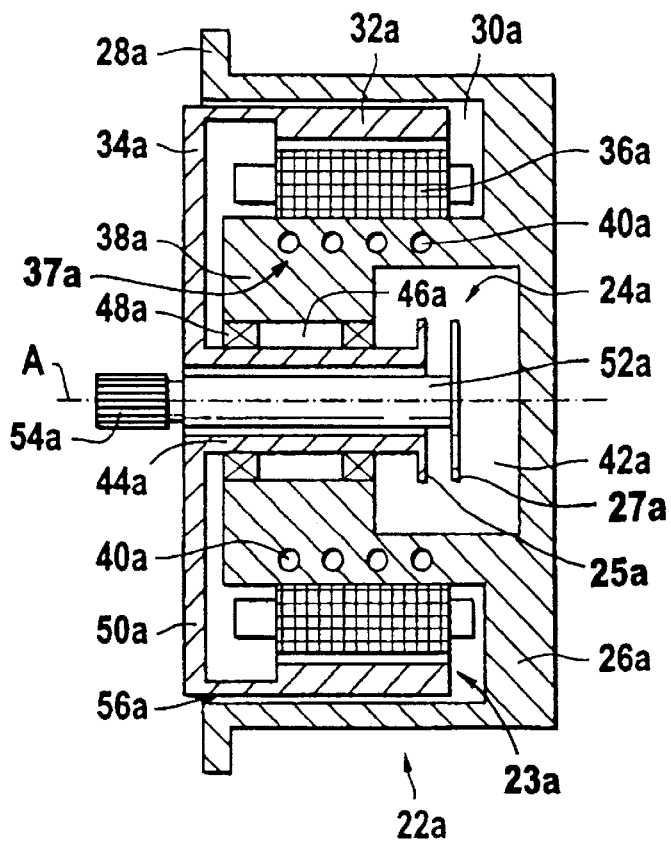
FIG. 2 is a sectional view of an embodiment of an electrical machine designed as a unit according to the present invention.

In the embodiment of FIG. 2, an electric motor unit 22a comprises an electrical machine 23a having a rotor 34a and a stator 37a. The electric motor unit 22a is surrounded by a body which will be referred to as a housing 26a having an attachment flange 28a for attachment to a support such as the transmission 14 in FIG. 1. An annular first cavity 30a is formed in the housing 26a and holds a cylindrical section 32a of an external rotor 34a of the electric machine 23a. The cylindrical section 32a has permanent magnets. The first cavity 30a also houses stator field windings 36a which are arranged radially inside the cylindrical section 32a. The cylindrical section 32a may be regarded as the rotor 34a of the electrical machine 23a, which is located radially further outward than stator field windings 36a. The stator field windings 36a are attached to a stator body section 38a, which is located radially inside of the cylindrical section 32a and which, together with the stator field windings 36a comprises the stator 37a of the electric motor unit 22a. The stator body section 38a of the housing body 26a has holes 40a, through which coolant flows to cool the stator field windings 36a during operation of the electrical motor unit 22a as an electric motor. According to FIG. 2, the housing 26a is shown as being integral with the stator body section 38a, but this is not essential and the stator body section 38a may comprise a separate piece that is connected to the housing 26a.

A second cavity 42a is formed inside the housing 26a, and holds a clutch 24a which is integrated in the electric motor unit 22a. The second cavity 42a extends radially inside the stator body section 38a, and thus radially inside the stator field windings 36a and the cylindrical section 32a of the rotor 34a. In this arrangement, the radial outside of the clutch 24a is enclosed by the stator 37a and by the cylindrical section 32a of the rotor 34a as a result of which the electric motor unit 22a has a short axial length.

The rotor 34a is mounted on a rotor shaft 44a which is designed as a hollow shaft and extends through an axial hole 46a in the stator body section 38a such that the rotor 34a is rotatable via a rotary bearing arrangement 48a.

The cylindrical section 32a of the rotor 34a includes permanent magnets and is held axially at one end on a disk 50a of the rotor 34a, which disk 50a extends in the radial direction and is firmly connected to the rotor shaft 44a. The rotary bearing arrangement 48a supports the rotor shaft 44a relative to the body 26a such that it can rotate and both the rotary bearing arrangement 48a and the rotor shaft 44a are enclosed radially on the outside by the stator body section 38a, the stator field winding 36a and by the cylindrical section 32a. Furthermore, the rotary bearing arrangement 48a is arranged on the rotor shaft axially between the radial disk 5a of the rotor 34a and the clutch 24a.

The clutch 24a includes a first clutch part 25a connected to the rotor shaft 44a such that they rotate together and a second clutch part 27a connected to an output drive shaft 52a and is used for coupling the rotor shaft 44a to the output drive shaft 52a which extends through the rotor shaft 44a, so that a connecting section 54a of the output drive shaft 52a projects out of the rotor shaft 44a and the housing 26a. The output drive shaft 52a is preferably mounted on the rotor shaft 44a so that it rotates. For this purpose, a special rotary bearing arrangement may be provided in the hollow rotor shaft 44a between the external circumference at the output drive shaft 52a and the internal circumference of the rotor shaft 44a. In addition, the output drive shaft 52a may be lengthened beyond the clutch to mount the output drive shaft 52a on the housing 26a and/or to facilitate rotation of the output drive shaft 52a.

The housing 26a in the embodiment of FIG. 2 has only a single opening 56a through which the cylindrical section 32a of the rotor 34a is inserted into the first cavity 30a and through which the output drive shaft 52a passes out of the housing 26a. The opening 56a is automatically closed by the flanged-connection of the electric motor unit 22a to the transmission 14 of FIG. 1 via the attachment flange 28a. Accordingly, separate closure plates or the like are not required.

Although the electric motor unit 22a of FIG. 2 shows only the single opening 56a, the electric motor unit 22a may also be designed such that the second cavity 42a is accessible other than solely through the axial hole 46a. For example, an opening could be provided on the side of the second cavity 42a opposite the axial hole 46a, and could be closed by a separate cover element. It is also possible to design the housing 26a in a plurality of parts. For example, two housing parts may be used which are connected in an axial separating plane containing a motor axis A. If an opening with an associated closure element or closure body is provided for providing access to the second cavity 42a, then the opening 56a need not be closed.

Figure 3:
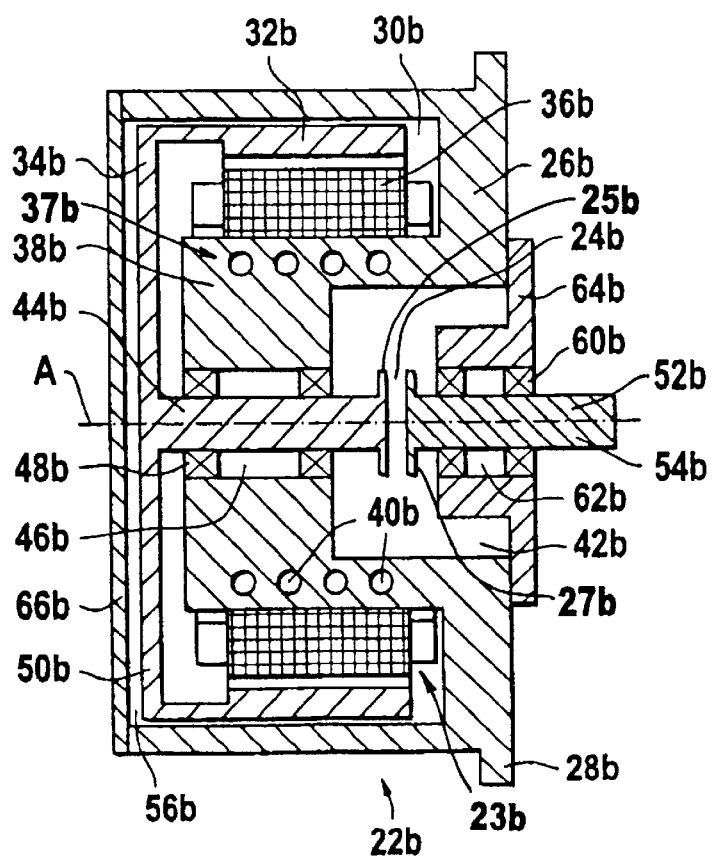
FIG. 3 is a sectional view of another embodiment of an electrical machine designed as a unit according to the present invention.

Another embodiment of the electric machine unit 22b is shown in FIG. 3 which differs from the embodiment of FIG. 2 in that a rotor shaft 44b without a cavity extends through a stator housing 38b and the output drive shaft 52b extends out of the electric motor unit 22b on the side of the electric motor unit 22b opposite the opening 56b. The rotor shaft 44b and the output drive shaft 52b are accordingly physically separated from one another by the first and second parts 25b, 27b of the clutch 24b. The output drive shaft 52b is mounted via a rotary bearing arrangement 60b in an axial hole 62b in a closure body 64b such that the output drive shaft 52b is rotatable. The closure body 64b is a separate piece from the housing 26b and closes the second cavity 42b. A closure plate 66b is provided as a further closure element and closes the opening 56b, which is used only for installation of the rotor 34b. The closure body 64b is fixed on the housing 26b and centered with respect to the axis A by attachment elements (which are not illustrated in FIG. 3), to ensure that the two shafts are arranged on the same axis.

In both of the embodiments of FIG. 2 and FIG. 3, the rotor shaft 44a, 44b and the output drive shaft 54a, 54b run on the same axis. This arrangement is preferred because it allows the electric motor unit 22a, 22b to be built as simple as possible. However, the inventive electric motor unit 22a, 22b may include an arrangement in which the rotor shaft 44a, 44b and the output drive shaft 54a, 54b are offset parallel to one another, with a corresponding translation gearbox between the two shafts. Furthermore, a non-parallel arrangement of the two shafts, with a translation gearbox which allows the direction of the power flow to be changed, may also be used.

The electric motor operation of the electrical machine 23a, 23b having an external rotor is not further explained here, since this is well known by a person skilled in the art. In this context, reference is made, for example, to DE 38 06 760 A1. For this reason, only the basic components of the electric machine 23a, 23b have also been mentioned.

Depending on the configuration of the electric machine 23a, 23b further components may also be included such, for example, as the sensor arrangement which responds to the magnetic fields of the permanent magnets of the rotor and detects the relative position of the rotor and stator. Furthermore, a control unit for actuating the field windings in accordance with the rotation of the rotor may be integrated in the electric motor unit 22a, 22b.

Figure 4:
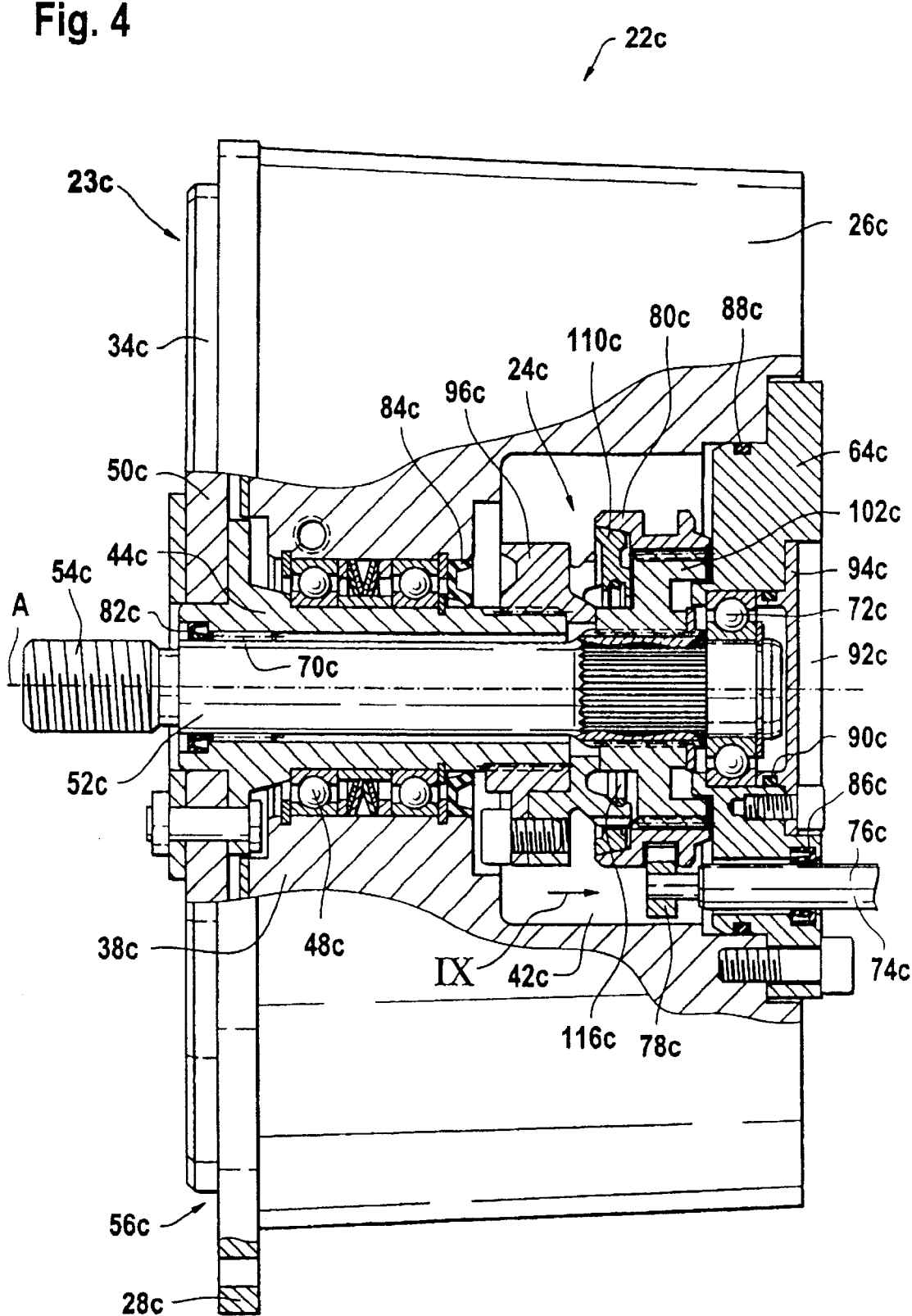
FIG. 4 is a more detailed cross-sectional view of an embodiment of the electrical machine unit shown in FIG. 2.
Figure 9:
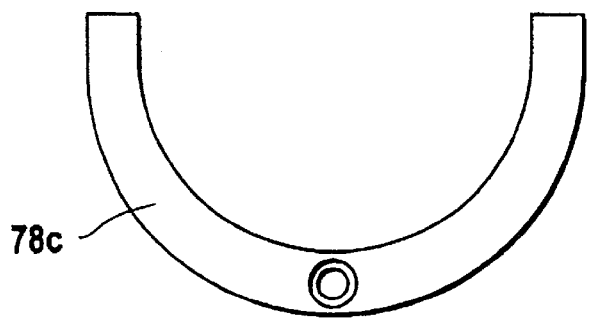
FIG. 9 is a view of a releasing bracket of the electrical machine unit of FIG. 4 along a direction indicated by arrow IX in FIG. 4.

FIG. 4 shows an electric motor unit 22c which corresponds to the embodiment type shown in FIG. 2 illustrated in more detail. A claw clutch 24c is arranged in a cavity 42c of the electric motor unit 22c and is covered via a closure body 64c. The electric motor unit 22c has a hollow rotor shaft 44c, to which a radial disk 50c of an external rotor 34c is flange-connected. The rotor shaft 44c is mounted on a stator body section 38c via a rotary bearing arrangement 48c, such that the rotor shaft 44c rotates within the stator body section 38c. An output drive shaft 52c extends through the hollow shaft 44c and is mounted such that it can rotate via a needle bearing arrangement 70c on the hollow shaft 44c and via a rotary bearing arrangement 72c in an annular opening 92c on the closure body 64c. The claw clutch 24c, which will be described in more detail hereafter, is designed as a positively locking clutch, and is mechanically operated via a releasing lever 74c. A push rod 76c of the releasing lever 74c is mounted in the closure body 64c such that it moves parallel to the motor axis A. The releasing lever 74c further comprises a releasing bracket 78c which acts on an annular clutch ring part referred to as synchronizing pinion 80c which moves axially for engagement and disengagement (see FIG. 7). FIG. 9 shows a plan view of the releasing bracket 78c, looking in a direction corresponding to that indicated by the arrow IX in FIG. 4.

The claw clutch 24c operates in an oil bath. Accordingly, the cavity 42c is sealed by shaft sealing rings (also called oil seals) 82c, 84c and 86c as well as by O-rings 88c and 90c. The shaft sealing ring 82c acts as a seal between the rotor shaft 44c and the output drive shaft 52c. The shaft sealing ring 84c acts as a seal between the rotor shaft 44c and the stator body section 38c. The shaft sealing ring 86c acts as a seal between the closure body 64c and the push rod 76c. The O-ring 88c acts as a seal between the closure body 64c and the stator body section 38c. The O-ring 90c acts as a seal between the closure body 64c (which is designed as an annular part) and a closure cover 94c which closes the annular opening 92c.

Figure 5A:
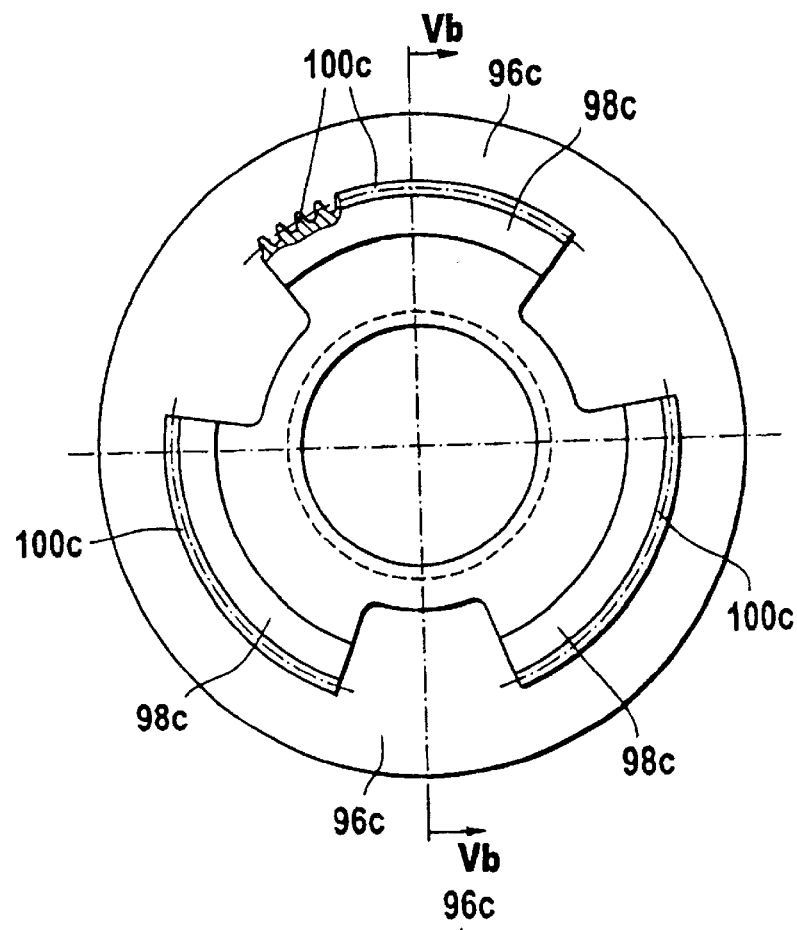
FIG. 5a is an axial view of a claw pinion of the electric machine unit of FIG. 4 along the direction indicated by arrow Va in FIG. 5b.
Figure 5B:
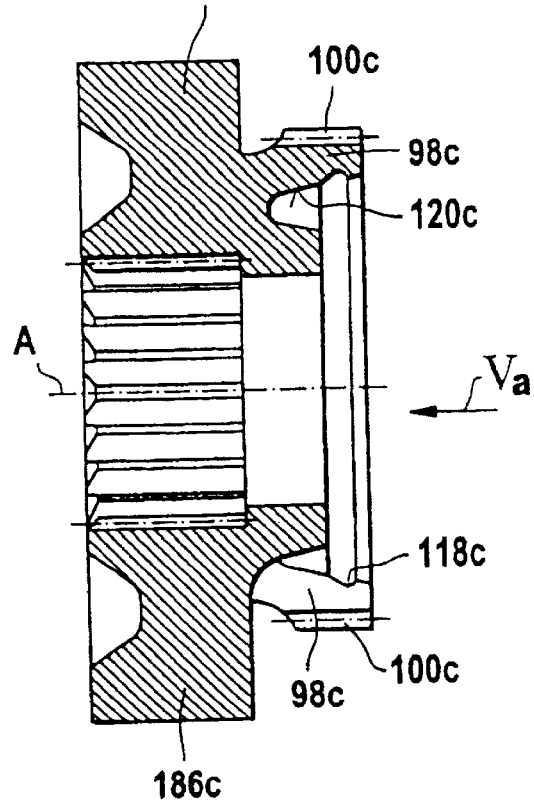
FIG. 5b is a sectional view along line Vb—Vb of FIG. 5a showing the claw pinion of the electric machine unit of FIG. 4.
Figure 6A:
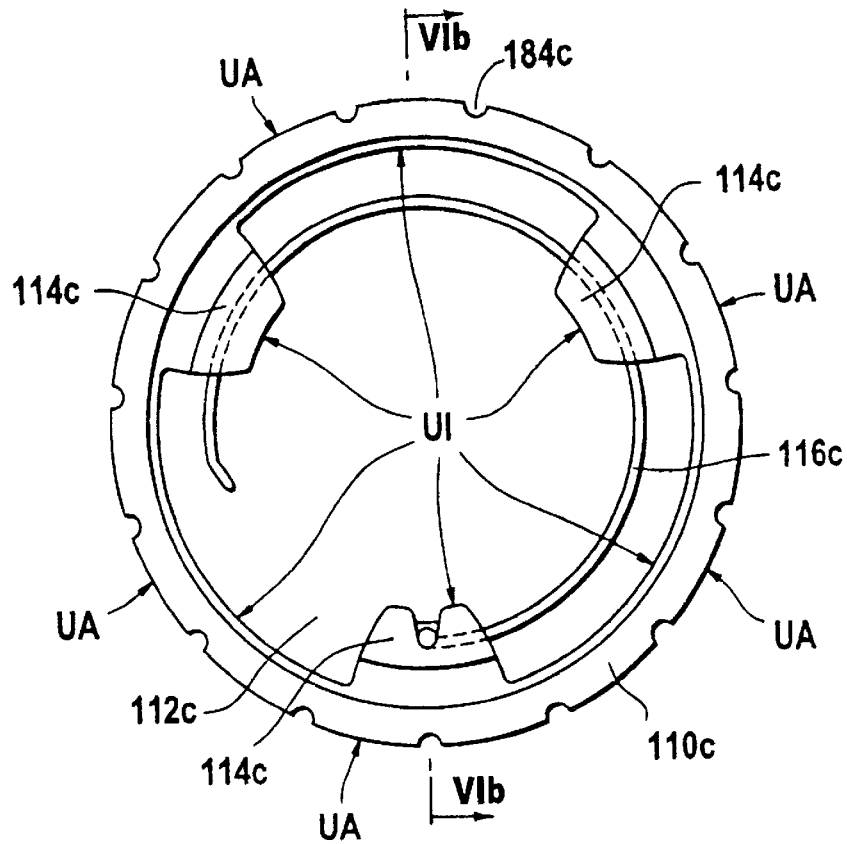
FIG. 6a is an axial view of a synchronizing ring of the electric machine unit of FIG. 4 along the direction indicated by arrow VIa in FIG. 6b.

The design of the claw clutch 24c and its method of operation will be explained in more detail in the following text. For this purpose, reference is also made to FIGS. 5a, 5b, 6a, 6b, 7 and 8 which show details of individual components of the claw clutch 24c. FIGS. 5b, 6b, 7 and 8 each comprise a cross section corresponding to a section plane containing the motor axis A. FIG. 5a is a plan view along the direction indicated by the arrow Va in FIG. 5b of the component shown in FIG. 5b, and FIG. 6a is a plan view along the direction indicated by the arrow VIa in FIG. 6b of the component shown in FIG. 6b. In comparison with FIG. 4, the components shown in FIGS. 5a, 5b 6a and 6b are shown rotated through 180° about the axis A.

Figure 6B:
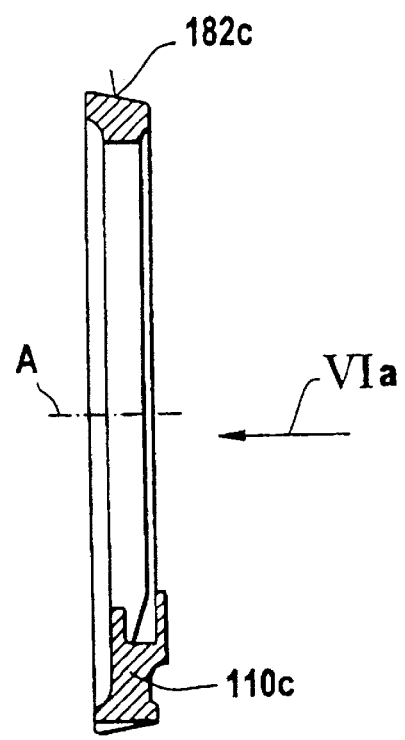
FIG. 6b is a sectional view along line VIb—VIb of FIG. 6a showing the synchronizing ring of the electric machine unit of FIG. 4.

The part shown in FIGS. 6a and 6b is an annular part comprising a synchronizing ring 100c. The external circumference of the synchronizing ring 110c and the internal circumference which bounds an annular opening 112c are denoted in FIG. 6a by arrows UA for the external circumference and arrows UI for the internal circumference.

The claw clutch 24c further comprises a claw pinion 96c connected to the rotor shaft 44c such that they rotate together (see FIGS. 5a and 5b). The claw pinion 96c has three vane-like projections 98c with a radially outer tooth system referred to as an outer switching tooth system 100c. The switching tooth system 100c is indicated only schematically in FIG. 5a.

Figure 7:
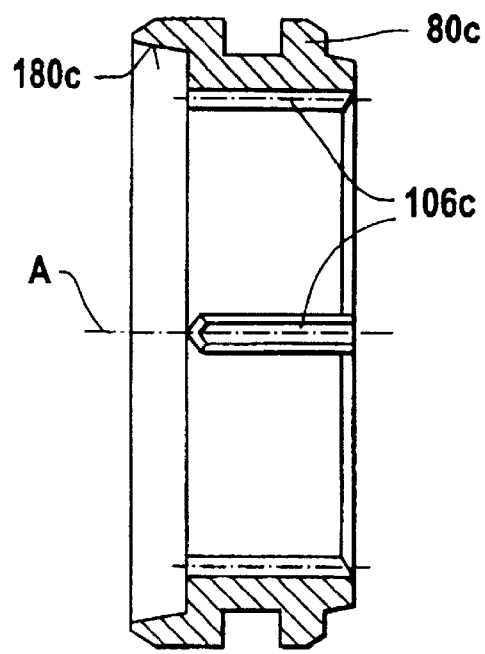
FIG. 7 is a sectional view of a clutch ring part of the electric machine unit of FIG. 4.
Figure 8:
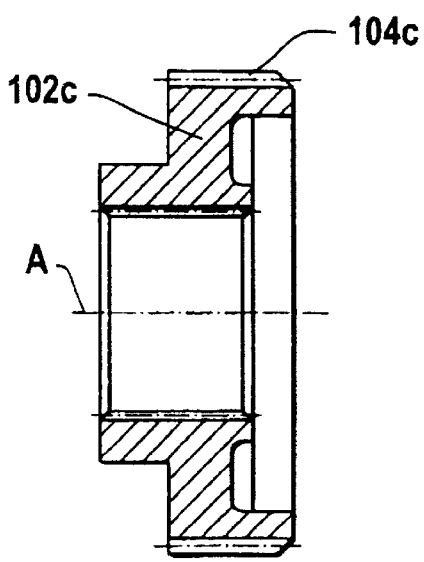
FIG. 8 is a sectional view of an output drive pinion of the electric machine unit of FIG. 4.

An output drive pinion 102c shown in FIG. 8 is arranged on the output drive shaft 52c such that they rotate together, and has a radially outer tooth system 104c. The already mentioned synchronizing pinion 80c (see FIG. 7), which may also be called a switching collar, is arranged on the output drive pinion 102c such that it can move axially. The synchronizing pinion 80c has a radially inner switching tooth system which may also be referred to as a switching claw arrangement 106c. The switching claw arrangement 106c on the synchronizing piston 80c is permanently connected in a positively locking engagement to the outer switching tooth system 104c of the output drive pinion 102c.

For engagement of the clutch 24c, the switching claw arrangement 106c of the synchronizing pinion 80c must also engage the outer switching tooth system 100c of the claw pinion 96c. To accomplish this engagement, the synchronizing pinion 80c is moved by the releasing lever 74c toward the claw pinion 96c, until the synchronizing pinion (the switching collar) 80c, the output drive pinion 104c and the claw pinion 96c are coupled in a positively locking manner, by a positive locking engagement of the switching claw arrangement 106c with both of the outer switching tooth system 104c of the output drive pinion 102c and the outer switching tooth system 100c of the claw pinion 96c.

The synchronizing ring 110c (see FIGS. 6a and 6b) is arranged between the synchronizing pinion 80c and the claw pinion 96c and is used for synchronizing, i.e., matching the rotation speeds of the synchronizing pinion 80c and the claw pinion 98c. The synchronizing ring 110c also prevents the positive locking engagement between the synchronizing pinion 80c and the claw pinion 96c before equal rotation speeds are reached. The synchronizing ring 110c is made of bronze and has three vane sections 114c which project radially inward into the annular opening 112c of the synchronizing ring 110c and engage between the three projections or vanes 98c of the claw pinion 96c. The claw pinion 96c and synchronizing ring 110c therefore cannot rotate significantly with respect to one another.

A spring 116c clamped between the claw pinion 96c and the synchronizing ring 110c engages an annular groove 118c (which is open radially inward) in the vane sections 98c of the claw pinion 96c and prestresses the synchronizing ring 110c into a predetermined axial relative position with respect to the claw pinion 96c. When the synchronizing ring 110c is in this predetermined axial position defined by the spring 116c, the switching claw arrangement 106c of the synchronizing pinion 80c is disengaged from the outer switching tooth system 100c of the claw pinion 96c. As long as the spring 116c engages the groove 118c, the synchronizing ring 110c is arranged in this predetermined axial position and thus prevents a positively locking engagement from being produced between the synchronizing pinion 80c and the claw pinion 96c. If the synchronizing ring 110c and the spring 116c are left to themselves, the synchronizing ring 110c assumes this predetermined axial position (blocked position), in which case the spring 116c (provided the spring 116c is not already latched in the groove 118c and is acting on an inclined surface 120c of the claw pinion 96c) slides on inclined surface 120c until it latches into the groove 118c, as a result of which the synchronizing ring 110c is held in the blocked position.

The following explains the engagement process of the claw clutch 24c in more detail. It is assumed that the output drive shaft 52c is rotating, for example because the electric motor is part of a parallel hybrid drive and the output drive shaft 52c is connected to a rotating transmission shaft. During pure internal combustion engine operation, the rotor shaft 44c is disengaged from the output drive shaft 52c by the claw clutch 24c. If the electric motor 23c is now switched on, then, for engagement that is as smooth as possible, it is recommended that the electric motor 23c be actuated such that the rotation speed of the rotor shaft 44c approximates the rotation speed of the output drive shaft 52c.

For the following description of the engaging process, it is assumed that either the rotor shaft 44c is stationary or there is a noticeable rotation speed discrepancy between the rotor shaft 44c and the output drive shaft 52c.

If the releasing lever 74c is operated in such a situation in such a way that the synchronizing ring 80c is moved toward the claw pinion 96c, then a wedge-shaped internal circumferential surface 180c of the synchronizing ring 80c acts on a correspondingly shaped external circumferential surface 182c (which is likewise essentially wedge-shaped) and produces a frictional engagement between the synchronizing pinion 80c and the synchronizing ring 110c and thus the claw pinion 96c (via the vane section 98c and 114c).

As long as the rotation speeds are not the same, the frictional driving connection between the synchronizing pinion 80c and the synchronizing ring 110c results in forces which act on the spring 116c and stress the spring in the sense of expanding it, that is to say engaging more strongly in the groove 118c. The vane sections 114c and 98c are, specifically, designed in such a way that a slight relative rotation is possible between the claw pinion 96c and the synchronizing ring 110c, during which the spring 116c prestresses the two transmission parts toward a middle relative rotation position. If the frictional driving connection between the synchronizing ring 110c and the claw pinion 96c is now rotated out of this middle relative rotation position, then the spring 116c is stressed in such a way that it cannot become unlatched from the groove 118c. As a consequence, the synchronizing ring 110c is held in its blocking position.

However, if the frictional driving connection between the synchronizing pinion 80c and the synchronizing ring 110c results in the synchronizing pinion 80c and the claw pinion 98c rotating at the same speed, then the synchronizing ring 110c once again assumes its middle relative rotation position with respect to the claw pinion 96c, and the spring 116c is permitted to unlatch from the groove 118c. The unlatching of the spring 116c now allows the synchronizing ring 110c to move toward the claw pinion 96c under the urgency of the releasing lever 74c until finally, the switching claw arrangement 106c of the synchronizing pin in 80c engages in a positively locking manner the outer switching tooth system 100c of the claw pinion 96c. The positively locking engagement is facilitated by alignment inclines on the switching claw arrangement 106c of the synchronizing pinion 80c. This is indicated in FIG. 7 for one tooth of the switching claw arrangement 106c illustrated by way of example.

It should also be stated that grooves 184c are provided in the external circumferential surface 182c of the synchronizing ring 110c for allowing oil to flow through so that the production of the frictional engagement between the internal circumferential surface 180c of the synchronizing pinion 80c and the external circumferential surface 182c of the synchronizing ring 110c is not impeded by the oil bath.

When disengagement occurs, the synchronizing pinion 80c is once again drawn toward the closure body 64c by the releasing lever 74c, until the positively locking engagement between the switching claw arrangement 106c on the synchronizing pin 80c and the outer switching tooth system 100c on the claw pinion 96c is disengaged. The spring 116c, which would have moved along the surface 120c (see FIG. 5b) toward the cylindrical body part 186c after unlatching from the groove 118c, then slides down the inclined surface 120c until it engages in the groove 118c once again, so that the synchronizing ring 110c once again assumes its blocking position. To simplify the disengagement process, the electric motor may be actuated in such a way that the switching tooth system 100c and the switching claw arrangement 106c, which are intended to be disengaged, are relieved of torques.

It should also be mentioned that engagement is directly possible even when the output drive shaft 52c is stationary. In this context, it has been found to be a good idea for particularly smooth engagement for the electric motor to be actuated in such a way that the rotor shaft 44c is repeatedly slightly rotated in alternating rotation directions (via repeated reversing drive of the electric motor).

It should also be mentioned that the claw clutch 24c is designed using a conventional synchronizing device from a standard motor vehicle transmission. Since such a synchronizing device is composed of mass-produced parts, this has major cost advantages. Other synchronizing devices which are designed and operate differently in detail, from other motor vehicle transmissions, may also be used directly.

Figure 10:
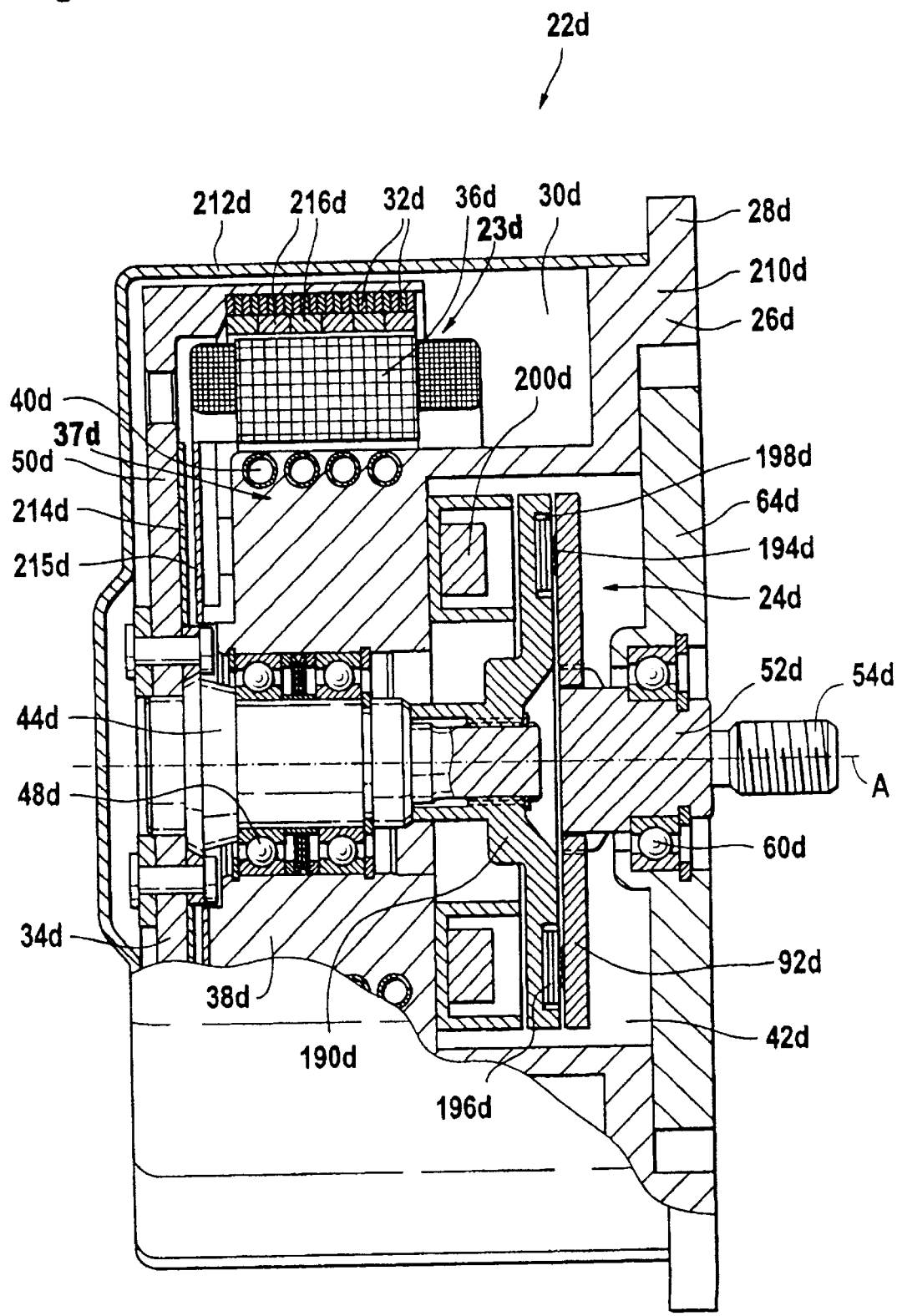
FIG. 10 is a more detailed cross-sectional view of another embodiment of the electrical machine unit shown in FIG. 2.

FIG. 10 shows an electric motor unit 22d according to another embodiment of the invention, which corresponds essentially to the embodiment in FIG. 3. However, in this embodiment, an electromagnetic friction clutch 24d is integrated in the electric motor unit 22d. The electromagnetic friction clutch 24d has a first disk 190d connected to the rotor shaft 44d such that the first disk 190d and the rotor shaft 44d rotate together, and a second disk 192d which is connected to the output drive shaft 52d such that the second disk 192d and the output drive shaft 52d rotate together. The second disk 192d is fitted via a diaphragm spring arrangement 194d with an anchoring ring disk 196d having a friction surface facing the first disk 190d. The anchoring ring disk 196d engages an annular groove 198d in the first disk 190d. The diaphragm spring arrangement 194d prestresses the anchoring ring disk 196d toward the second disk 192d into a position in which the friction surface of the anchoring ring disk 196d does not act on an annular base surface of the annular groove 198d, which is used as a mating friction surface.

An electromagnet arrangement (clutch magnet arrangement) 200d is fitted to a stator body section 38d and, in the energized state, draws the anchoring ring disk 196d against the annular base surface of the annular groove 198d, and thus produces a frictional engagement between the first clutch disk 190d and the second clutch disk 192d. The clutch 24d is engaged by producing this frictional engagement. For disengagement, the energizing current through the electromagnet arrangement 200d is simply interrupted, so that the diaphragm spring arrangement 194d removes the frictional engagement between the two disks 190d and 192d by lifting the anchoring ring disk 196d off the annular base surface of the annular groove 198d. Alternatively, the anchoring ring disk 196d and the annular base surface of the annular groove 198d could also be provided with a respective tooth system to provide a positively locking clutch rather than a frictional clutch.

The embodiment in FIG. 10 includes a housing 26d that is designed differently than the housing 26b in FIG. 3. The housing 26d comprises a body section 210d fitted with various electric motor components, and a separate pot-shaped housing part 212d which has no load-bearing function and is placed over the rotor 34d and the body 210d. The electric motor 23d has a sensor arrangement including a rotor resolver 214d and a stator resolver 215d which are used to detect the rotation position of the rotor 34d with respect to the stator 37d. FIG. 10 also shows permanent magnets 216d arranged on an internal circumference of the cylindrical section 32d of the rotor 34d.

In summary, the invention relates to a parallel hybrid drive for a motor vehicle, and to an electric motor unit for such a parallel hybrid drive. According to the invention, a clutch is integrated in the electrical machine of the parallel hybrid drive or of the electric motor unit, in order to allow them to be disengaged from the drive train, so that the drive can be provided purely by the internal combustion engine without a rotor of the electrical machine or of the electric motor unit also rotating.

The invention is not limited by the embodiments described above which are presented as examples only but can be modified in various ways within the scope of protection defined by the appended patent claims.

I claim:

1. A parallel hybrid drive for a motor vehicle, comprising:
    a drive train connecting an internal combustion engine to a transmission and connecting an electrical machine to said transmission, wherein said electrical machine comprises an external rotor arranged radially outside of a radially inner stator comprising a body section of said electrical machine;
    said drive train comprising a first clutch arraigned between said internal combustion engine and said transmission for selectively drivably connecting said internal combustion engsid to said transmission, said transmission being arranged between said first clutch and said electrical machine; and
    said drive train further comprising a second clutch integrated in said electrical machine and operatively arranged for selectively connecting said electrical machine to a remainder of said drive train, said second clutch beiss arranged in a cavity in said electrical machine bounded at least partially by said body section, said second clutch being coaxial with respect to said external rotor and wherein said external rotor radially surrounds at least a portion of a radial outside of said second clutch.

2. The parallel hybrid drive of claim 1, wherein said electrical machine and said second clutch comprise an electric motor unit that is separate from said transmission.

3. The parallel hybrid drive of claim 1, wherein said rotor is connected to a rotor shaft at a rotor connection such that said rotor and said rotor shaft rotate together, said rotor shaft being inserted at least partially in said body section, and a shaft bearing arrangement arranged between said body section of said electrical machine and said rotor shaft such that said rotor shaft is rotatably mounted on said body section.

4. The parallel hybrid drive of claim 1, wherein said external rotor comprises a permanent-magnet rotor.

5. The parallel hybrid drive of claim 1, further comprising a closure body comprising a separate piece from said stator body connected for closing said cavity, wherein said electrical machine surrounds an output drive shaft rotatably arranged for rotation about the axis of rotation of said rotor shaft, said output drive shaft being engagable with said rotor shaft via said second clutch, and wherein the output drive shaft is mounted on said closure body such that said output drive shaft is rotatable with respect to said closure body.

6. The parallel hybrid drive of claim 1, wherein said second clutch comprises one of a mechanically operated clutch, an electrically operated clutch, an electromagnetically operated clutch, a hydraulically operated clutch and a pneumatically operated clutch.

7. The parallel hybrid drive of claim 1, wherein said second clutch comprises a synchronized positively locking claw clutch.

8. The parallel hybrid drive of claim 1, wherein the second clutch comprises an electromagnetically operated friction clutch.

9. The parallel hybrid drive of claim 2, wherein an assembly comprising said transmission assembled with said electric motor unit forms a drive unit.

10. The parallel hybrid drive of claim 3, wherein said shaft bearing arrangement is arranged at a position axially between said second clutch and said rotor connection on said rotor shaft.

11. The parallel hybrid drive of claim 3, wherein said electrical machine surrounds an output drive shaft rotatably arranged for rotation about the axis of rotation of said rotor shaft, said output drive shaft being engagable with said rotor shaft via said second clutch.

12. The parallel hybrid drive of claim 4, wherein said electrical machine comprises a rotor shaft connected to said external rotor and a shaft bearing arrangement arranged in said radially inner stator for rotatably supporting said rotor shaft, and wherein said external rotor radially surrounds at least a portion of said shaft bearing arrangement.

13. The parallel hybrid drive of claim 4, wherein said rotor further comprises a radial part connecting said external rotor to said rotor shaft and said shaft bearing arrangement is arranged axially between said second clutch and said radial part.

14. The parallel hybrid drive of claim 11, wherein said second clutch is arranged between said rotor shaft and said output drive shaft and physically separates them from each other.

15. The parallel hybrid drive of claim 11, wherein said rotor shaft comprises a hollow shaft through which said output drive shaft extends to a position beyond an end of the hollow shaft remote from the second clutch, wherein a portion of said output drive shaft projecting beyond said end of said hollow shaft comprises a connecting section for connecting said electrical machine to a component of said drive train.

16. The parallel hybrid drive of claim 11, wherein said second clutch comprises a claw clutch including a first pinion with a tooth system arranged on a rotor shaft side of said claw clutch, a second pinion with a tooth system arranged on an output drive shaft side of said claw clutch, and a synchronizing pinion axially movable arranged in said claw clutch and having a switching claw arrangement in a continuous positive-locked engagement with said tooth system of one of said first and second pinions and selectively axially movable into an engaged position in a positive locked engagement with the tooth system of the other of said first and second pinions, said claw clutch further comprising a synchronizing ring operatively arranged between said synchronizing pinion and the other of said first and second pinions for synchronizing the rotation speeds of said synchronizing pinion and the other of said first and second pinions via a friction coupling when said synchronizing pinion is moved toward said engaged position, said synchronizing ring further operatively arranged for preventing movement of said synchronizing ring to said engaged position before the rotation speeds are synchronized.

17. The parallel hybrid drive as claimed in claim 15, wherein the output drive shaft is rotatably mounted within said hollow shaft so that said output drive shaft is rotatable with respect to and within said hollow shaft.

18. The parallel hybrid drive of claim 15, wherein said electrical machine and said second clutch comprise an electric motor unit that is separate from said transmission, said electric motor unit having a housing with an opening for receiving said hollow shaft and said rotor during installation and wherein said connecting section of said output drive shaft projects out of said opening.

19. The parallel hybrid drive of claim 18, wherein said housing comprises an attachment arrangement proximate said opening for attachment of said housing to said transmission, wherein said opening is at least partially closed by said transmission.

20. The parallel hybrid drive of claim 7, wherein said claw clutch comprises a synchronizing device of a motor vehicle transmission.

\* \* \* \* \*